Dec. 16, 1930.  C. A. ROWLEY  1,785,496
APPARATUS FOR CUTTING SHEET GLASS
Filed May 19, 1924  4 Sheets-Sheet 2

INVENTOR.
Clifford A. Rowley

Dec. 16, 1930.    C. A. ROWLEY    1,785,496
APPARATUS FOR CUTTING SHEET GLASS
Filed May 19, 1924    4 Sheets-Sheet 3

INVENTOR.
Clifford A. Rowley

Patented Dec. 16, 1930

1,785,496

UNITED STATES PATENT OFFICE

CLIFFORD A. ROWLEY, OF TOLEDO, OHIO, ASSIGNOR TO LIBBEY-OWENS-FORD GLASS COMPANY, OF TOLEDO, OHIO, A CORPORATION OF OHIO

APPARATUS FOR CUTTING SHEET GLASS

Application filed May 19, 1924. Serial No. 714,416.

This invention relates to an apparatus for cutting or scoring transversely, at intervals, a continuously drawn sheet of glass.

In certain systems of producing sheet glass, a continuous flat sheet of glass is drawn from a molten source, and passed through a horizontal leer. The continuous sheet of glass emerges from the leer onto a moving table or conveyor, known as the "cutting table", and while on this table, sections are cut off from the advancing end of the sheet, which sections are carried away to the cutting room where they are divided into the desired sizes. This cutting of sheets or sections from the continuously advancing ribbon of glass is usually performed with a hand operated cutting tool which is drawn across the sheet at intervals. These score lines are seldom accurately straight or perpendicular to the line of travel of the sheet. The distance between score lines is also only roughly measured, so that there is considerable waste at the ends where the sheets are afterwards accurately cut down to the desired sheet sizes.

The object of the present invention is to provide an apparatus for accurately scoring the sheet along straight transverse lines perpendicular to the travel of the sheet. Means are also provided to measure the length of the sheet sections accurately, that is, measure accurately the distance of the score line from the advancing end of the ribbon where the last preceding cut was made. In this way the sheet sections will be cut with accurate parallel end edges, a fixed distance apart, so that there will be no necessary waste at these ends of the sheet sections during the subsequent cutting process.

Other objects and advantages of the invention will become apparent from the following detailed description of certain approved forms of the apparatus.

Referring first to the form of the apparatus shown in Figs. 1 to 10 inclusive, the flat continuous sheet of glass 1 emerges from the end of leer 2, onto the moving supporting table or conveyor 3 which moves at the same speed as the sheet of glass. This table 3 may take a variety of forms, but is here shown as comprising a series of parallel endless chains 4, carrying a series of wood blocks 5, which form in the upper run of the chains a flat even supporting table for the glass sheet. Each chain has a series of rollers 6, which, in their upper run, travel on the supporting tracks 7. The chains are carried at their ends on rollers or sprockets 8, one of which is driven by any suitable means as shown at 9, Fig. 1, to move the table in the same direction and at the same speed as the sheet 1.

It has been customary in former practice, to divide the endless sheet or ribbon 1 into sections of the desired size, by manually drawing a scoring tool, at intervals, across the moving sheet. Since the sheet is in motion, it is particularly difficult to make an accurate straight cut exactly at right angles to the line of travel of the sheet. It is also difficult to accurately measure off the desired length of sheet between the successive score lines. After the sheet is scored it is broken along the scored line by inserting the hand or a tool beneath the edge of the sheet, and elevating the sheet until it cracks along the scored line.

The present invention is designed to more accurately and simply perform the above operations, thus saving both labor and glass. Mounted at each side of and beneath the conveyor table are short rails 10 mounted at their ends on the supporting structure 11 for the cutting table. The rails 10 at either side of the table extend parallel to each other and to the direction of travel of the sheet and cutting table. They need not be very long as the total travel of the cutter-carriage which moves thereon will be only a few inches. A carriage 12 extending transversely beneath the cutting table and glass sheet has rollers 120 which are supported on and guided by the rails 10. At either end of the table a wall 13 extends upwardly above the cutting table 3 and glass sheet 1, and these walls 13 are joined by a transverse cutter guide or guide bar 14. This bar 14, in any position of the carriage 12, extends above the glass sheet 1 accurately at right angles to the direction of travel of the sheet.

The cutting or scoring tool is adapted to be guided back and forth along this bar 14. The scoring tool and the means for carrying same may be made in a variety of forms, one approved example being shown more particularly in Figs. 3, 9 and 10. As here shown, the guide rail 14 is rectangular in cross-section, and a tool carriage 15 has a slidable fit upon the guide bar 14. In recess 16 at one side of carriage 15 a supporting frame 17 is pivoted on the fixed pin 18. This frame 17 is normally pushed up by compression spring 19 until the upper side of its free end contacts with a stop 20 in the upper portion of recess 16. By means of a manually operated mechanism presently to be described, the frame 17 may be pushed down against the action of spring 19 until its free end is in contact with stop 21 in the lower side of recess 16. Pivoted at 22 in frame 17 is a cutter-carrying arm or lever 23 having an outwardly extending boss or projection 24 at its free end in which an ordinary cutting or scoring tool 25 may be removably held by set-screw 26. The scoring tool 25 is of the ordinary steel-wheel type, but any approved form of cutter such as a diamond might be used. When frame 17 is held up against stop 20 by spring 19, the cutter 27 will be held above and out of engagement with the glass sheet 1. When frame 17 is pushed down against stop 21 the cutter 27 will be held in yielding engagement with the glass sheet by means of compression spring 28 bearing at one end upon a portion of frame 17, and at the other end against the cutter carrying lever 23. A short push rod 29 rests at one end upon the upper free end portion of frame 17, and extends upwardly through an aperture in the top of carriage 15. Mounted in a fixed bearing 30 on the top of carriage 15 is a short rotary stub-shaft 31. This shaft is held from longitudinal motion through bearing 30 by collars 32 at either side of the bearing. An arm or cam 33 projecting from one side of shaft 31 swings in a slot 34 in the bearing 30 and presses against the upper end of the pin or push rod 29. A rather long rod or operating handle 35 is connected through universal joint 36 with one end of stub-shaft 31.

Figures 4, 5, 6, 9, 10:
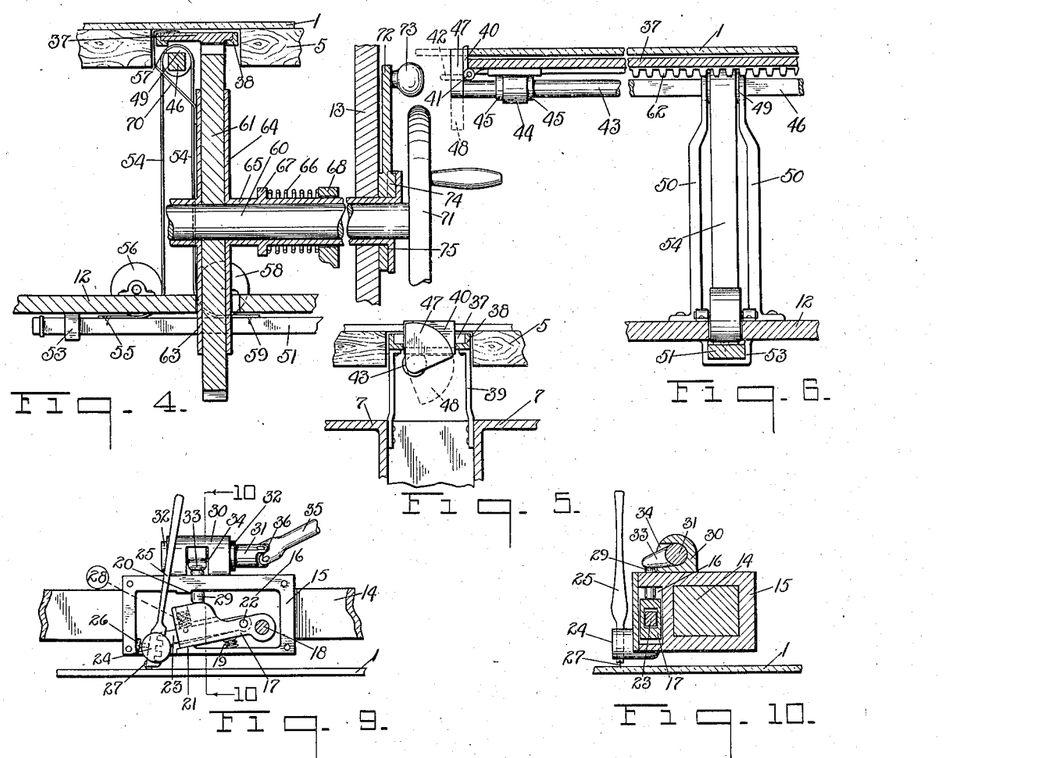
Figs. 4, 5, 6 and 7, are detail views of portions of the measuring apparatus.
Fig. 9 is an elevation of the scoring device, with the cover plate removed.
Fig. 10 is a transverse section taken substantially on the line 10—10 of Fig. 9.

The operator grasps the outer end of operating rod 35 and pushes the carriage 15 and the scoring tool carried thereby backward and forward along the guide rod 14. At the same time by giving a short twisting motion to the rod 35 the cam 33 may be swung down against pin 29, thus forcing carriage 17 down against stop 21 and moving cutter 27 into yieldable engagement with the glass sheet. It will be seen that the tool will be held out of engagement with the sheet at all times unless the twisting motion is imparted to the handle 25. In this way the tool is automatically held out of engagement with the sheet during the return movement of the tool carriage, and during the working stroke the tool may be pressed down or elevated from the sheet as desired.

The above is merely one example of a scoring device that can be mounted on guide 14. Also the guide 14 could be made simply in the form of a straight-edge, and an ordinary hand-operated scoring tool drawn along this edge.

It is obvious that since the glass sheet 1 and table 3 are continually moving, it is necessary that the carriage 12 and cutter guide 14 move with the table and sheet while the scoring operation is being performed. The present invention embodies two distinct means for moving the carriage with the sheet during the scoring operation, one of which will be first described which embodies means for accurately measuring the distance from the free end of the sheet to the new score line.

Referring now more particularly to Figs. 3, 4, 5, 6 and 7, a combined measuring-rod and draw bar 37, which is somewhat longer than the greatest length of sheet to be cut with this apparatus, is mounted below the path of travel of sheet 1 in one of the spaces between two adjacent rows of supporting blocks 5 carried by chains 4. The bar 37 is supported in fixed channels 38 so that it may slide thereon longitudinally. The channel bars 38 are carried by bracket-arms 39 extending upwardly from the fixed tracks 7, heretofore described. At the end of bar 37 remote from the leer, a small plate or flapper 40 is pivoted as at 41 so that when in operative position it will project up across the path of travel of the advancing end of glass sheet 1. When swung down into the inoperative position shown in dotted lines at 42, Fig. 6, it will be out of the path of travel of the sheet 1 which may at that time pass freely thereover. A rod 43 of substantially the same length as draw bar 37 is rotatably mounted below bar 37 in bearings 44, one near either end of bar 37. The bar 37 and rod 43 supported thereby move longitudinally as a unit along the trackways 38. The end portions of rod 43 which are mounted in bearings 44 are round so that they may turn in these bearings and are provided with stop collars 45 to prevent longitudinal movement of the rod 43 with respect to draw bar 37. The main longitudinal portion of bar 43 is of square cross-section as shown at 46, for a purpose presently to be described.

At the end adjacent plate or flapper 40, a cam plate 47 is secured to or formed on rod 43. When turned up into the position shown in full lines Figs. 5 and 6, this cam 47 will hold plate 40 in its upper sheet-engaging position. When cam 47 is turned down into the dotted line position shown at 48, Figs. 5 and 6, it will be moved away from the plate 40 and allow this plate to fall into the inoperative position as shown in dotted lines at 42 in Fig. 6. A cylindrical spool 49 is slidably mounted on the square portion 46 of rod 43, and this spool 49 is held from longitudinal movement relative to carriage 12 between arms 50 projecting upwardly from a fixed portion of the carriage. A push rod 51 having an operating handle 52 at its outer end (see Figs. 1, 2 and 3), is slidable through brackets 53 on carriage 12. A steel tape 54 is fixed at one end 55 to the push rod 51, then extends upwardly around a guide roller 56 mounted on frame 12 and thence over the spool 49 to which it is attached at one point 57. The other half of tape 54 extends down under a second guide roller 58, similar to roller 56, and is attached at its other end 59 to the push rod 51. It will be noted that as push rod 51 is moved in or out for a short distance the spool 49 and hence the rod 43 will be rotated through a short arc. The necessary rotation to move the cam 47 to either of its two positions requires no more than a 90 degree rotation of the spool 49 and bar 43.

A shaft 60 rotatably mounted in bearings on carriage 12 has keyed thereto a large spur gear 61 which meshes with a rack 62 formed on the lower side of draw bar 37. This rack 62 extends nearly from end to end of the bar 62, being practically coextensive with the square portions 46 of rod 43. Gear 61 is normally held against rotation between a fixed clamping plate 63 and a movable clamping plate 64. Plates 63 and 64 have portions engaging with a fixed part of carriage 12 so that they are held against rotation. Movable clamping plate 64 is formed at one end of a sleeve 65 which surrounds shaft 60 and extends out through the face plate 13 at the operator's end of carriage 12. A compression spring 66 surrounds a portion of sleeve 65, with one end bearing against a flange 67 on sleeve 65 and the other end bearing against fixed bracket 68 of carriage 12. This spring 66 serves to normally hold the movable plate 64 in clamping engagement with one side of gear 61. Since this gear 61 is normally held immovable on carriage 12 and certain of its teeth are in engagement with certain teeth of the rack on bar 37, the draw bar and the carriage will move together as a unit. In other words, when the moving glass sheet 1 engages the plate or flapper 40 at the end of the draw bar, the carriage 12 and the mechanism carried thereby will be drawn along by this bar 37 at the same speed as the sheet 1 and conveyor table 3.

Figure 7:
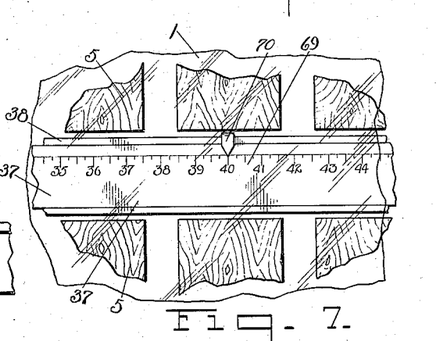
Figure 8:
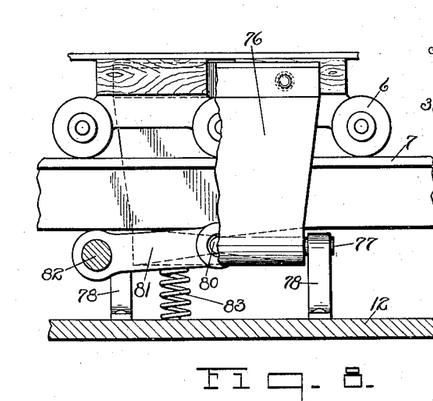
Fig. 8 is a detail view, partially broken away, of the manually operated carriage clamp.

On the upper face of bar 37 a scale 69 is engraved, this scale being calibrated to show in inches and fractions thereof the distance between the inner face of flapper 40 when in vertical position and the transverse line along which the scoring tool will be moved. In other words, this scale governs the length of the sheet that will be cut. A pointer 70 carried by carriage 12 indicates on scale 69 the length of sheet for which the mechanism is adjusted. For example as shown in Fig. 7, a 40 inch sheet will be cut. The outer end of shaft 60 is provided with a hand-wheel 71 for rotating the gear 61 and moving the bar 37 backward or forward with relation to the carriage. A lever 72 provided with an operating handle 73 is pivoted at its lower end around the sleeve 65 outside of plate 13, and is provided with a cam surface 74 cooperating with a cam surface 75 on the flanged end of sleeve 65, whereby a swinging movement of lever 72 about the axis of shaft 60 causes cams 74 to engage cams 75 and draw out the sleeve 65 against the action of spring 66 to release clamping plate 64 from gear 61. When this has been done the hand-wheel 71 may be freely turned to move the bar 37 backward or forward until the desired length of sheet is indicated on scale 69 opposite pointer 70.

Also mounted on carriage 12 is a pair of opposed bell-crank clamping levers 76 pivoted at 77 in brackets 78 on carriage 12. (See more particularly Figs. 3 and 8.) The upper end of each bell-crank 76 carries a yieldably mounted clamping plate 79 for engaging respective ends of one or more of the wooden blocks 5 comprising a portion of the sheet carrying conveyor table 3. The lower inwardly extending arms 80 of the bell-cranks are engaged by a crank arm 81 secured to rotary shaft 82 rotatably mounted in carriage 12. A spring 83 mounted between crank 81 and a portion of the carriage normally tends to move this crank in such a direction as to release the clamping plates 79 from the block 5. At the outer end of shaft 82 is secured a gear 84 meshing with a rack 85 on a vertically movable push rod or pin 86. (See Fig. 2.) A compression spring 87 is mounted between the operating handle or knob 88 at the upper end of pin 86 and the bracket 89 through which the pin moves vertically. When the knob 88 is pushed down against the action of spring 87, shafts 82 will be rotated and the clamping plates 79 will be moved into engagement with the ends of one or more of the blocks 5. This will cause the carriage 12 to move along with the upper run of the conveyor table and hence with glass sheet 1 so long as operating handle or knob 88 is held down. When the knob is released the springs 87 and 83 will return the parts to normal position, releasing clamps 79 from blocks 5 and freeing the table from the conveyor.

Weights 90 are suspended from one end of cables 91 which pass up over guide rollers 92 and are secured at their other ends to the carriage 12. When the carriage is released these weights return the carriage along guides 10 to its normal position which is regulated by the screw-stops 93 mounted on rails 10 and engaging with a suitable portion of the carriage frame. Springs 94 may be used to cushion the return engagement of the carriage against the stops 93.

Figure 1:
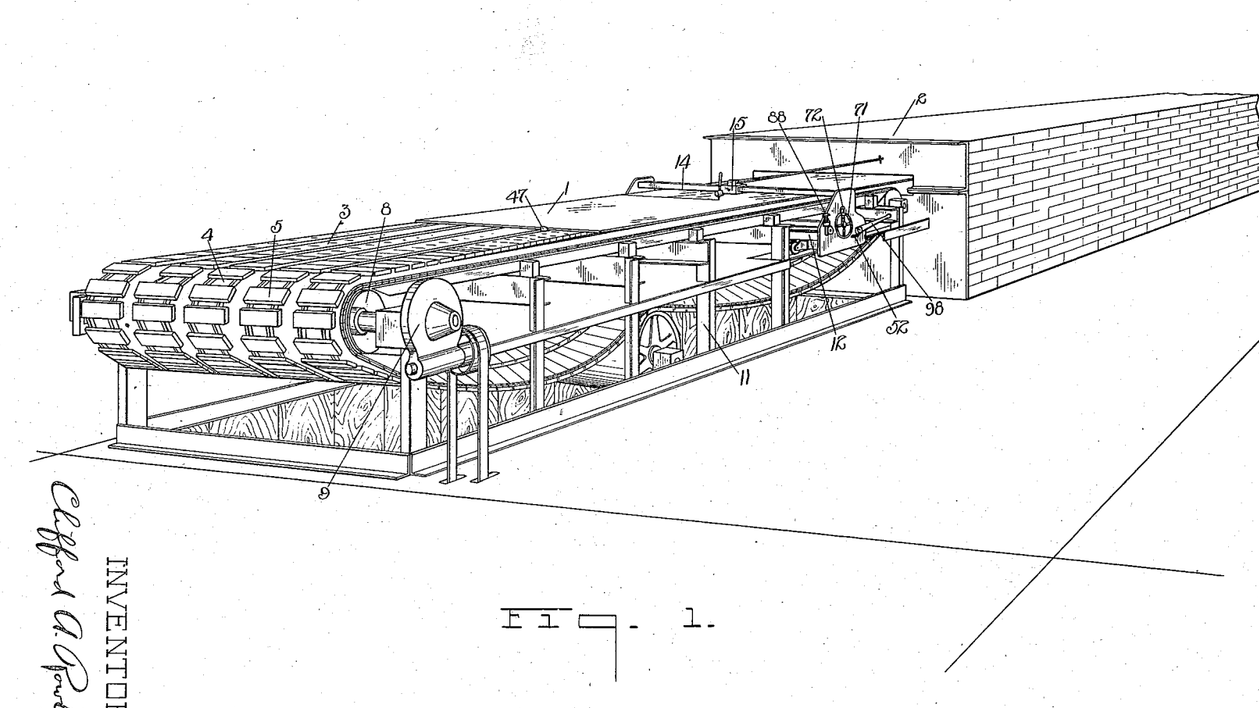
Fig. 1 is a perspective showing the end of the leer, and the cutting table with the scoring apparatus forming the subject-matter of the present invention installed thereon.
Figure 2:
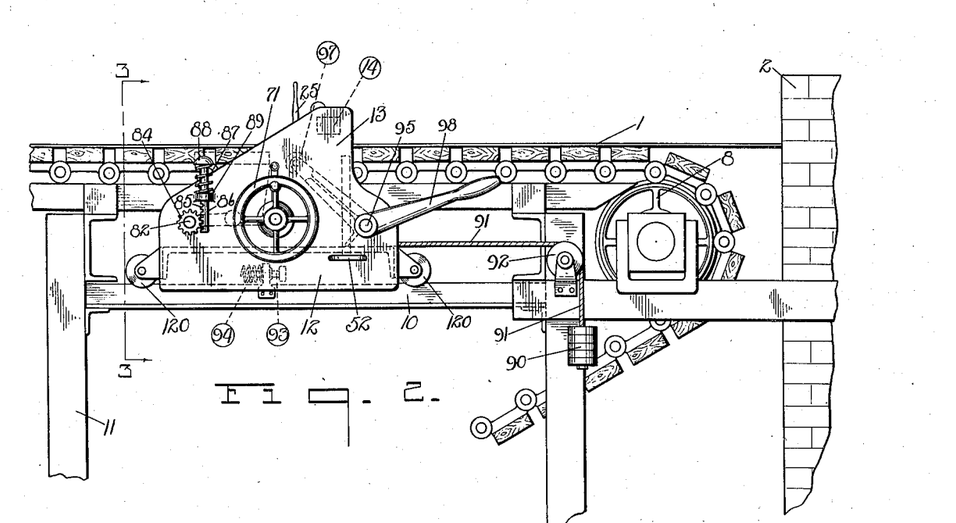
Fig. 2 is an end view of the cutter carriage, and adjacent portions of the cutting table, on an enlarged scale.
Figure 3:
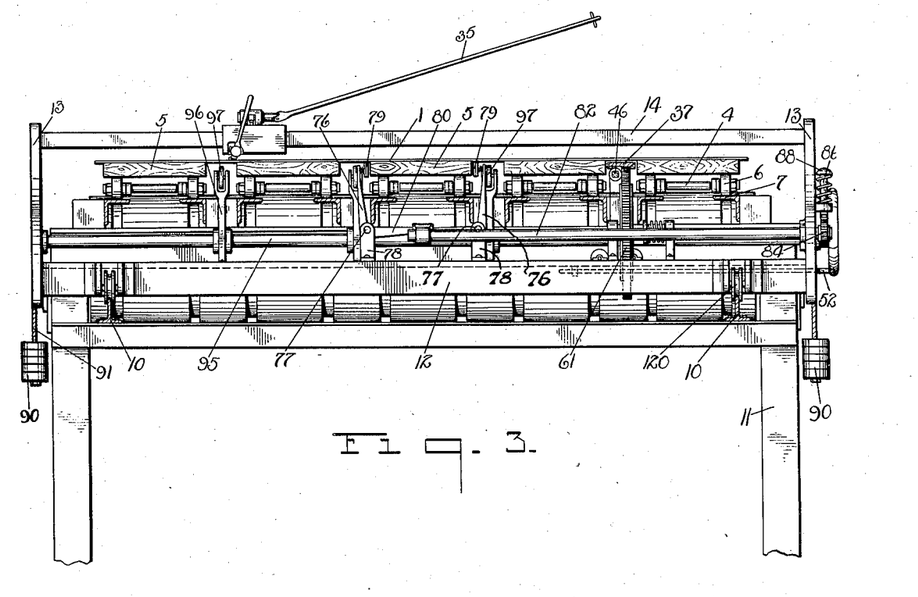
Fig. 3 is a vertical transverse section taken substantially on the line 3—3 of Fig. 2.

Also mounted on carriage 12 is a "crack-off" device comprising a horizontal shaft 95, see Figs. 2 and 3, pivoted in the carriage beneath the sheet and conveyor, and carrying a series of crank arms 96, each having a roller 97 at its upper end, one of these arms extending up through each of the spaces between the rows of sheet carrying blocks 5. By means of an operating handle 98 on the outer end of shaft 95, the rollers 97 may be simultaneously moved up against the glass sheet beneath the scored line produced by tool 27, thus elevating this portion of the sheet above the supporting table until it cracks along the score line. When handle 98 is released the rollers 97 and clamp arms 96 will fall back away from the sheet due to their own weight.

We will assume that the sheet cutting operation is to be started and that sheet 1 is advancing from leer 2 along the conveyor 3 past the cutting device. The operator will throw the release lever 72 to one side and rotate hand-wheel 71 until the desired length of sheet is indicated on scale 69 opposite pointer 70. This can be viewed through the glass sheet 1 as indicated in Fig. 7. When this adjustment has been made for the desired length of sheet, lever 72 is moved back to clamping position so as to lock the gear 61 against further movement. No further manipulation of this adjusting device is necessary so long as sheets of this length are to be cut. The operator then pushes in the handle 52 at the outer end of push rod 51 to the position indicated in the drawings. This will rotate rod 43, lifting cam 47, and throwing plate or flapper 40 into operative position as shown in full lines in the drawings. When the edge of the moving sheet 1 has advanced to such a point that it engages with the plate 40, the draw bar 37, carriage 12 and all of the parts mounted thereon will commence to move with the sheet. The operator will now grasp the handle 35, push the scoring tool carriage 15 to the far end of guide 14, give the handle 35 a partial rotation to throw the scoring tool into engagement with the glass sheet and then draw the tool along guide 14 across the upper face of the sheet. When the operating handle 35 is released the tool is automatically raised from the sheet as previously described. The operator now depresses handle 98, thus elevating rollers 97 and breaking off the sheet along the scored line. Handle 52 is now pulled out, thus rotating rod 43 and cam 47 and allowing the plate 40 to be swung down to its inoperative position, thus releasing the carriage from the sheet and allowing the sheet 1 and the conveyor to pass on beyond the end of the draw bar. Weights 90 now return carriage 12 to normal position against the stops 93. After the cut off portion of the sheet has been removed from the conveyor, handle 52 is again pushed in to again elevate plate 40 to operative position and the mechanism is reset for the next cutting operation, which may be performed as soon as sheet 1 engages the plate 40 and the carriage again commences to move with the advancing sheet.

If at any time it is desired to cut a shorter length of sheet in order to remove a defect or for any other reason, the operator may press down on knob 88, thus engaging clamping plates 79 with a portion of the conveyor table and causing the carriage to move with the sheet. While this knob 88 is held down the scoring operation is performed as heretofore described. As soon as knob 88 is released the carriage will be released from the table and returned to normal position by weights 90. It will be noted that if desired the sheet engaging plate 40 may be allowed to remain permanently in lowered or inoperative position and the entire operation carried on by means of the hand-operated-clamp controlled through knob 88. At any time during the cutting operation the machine may be quickly reset for cutting the new length of sheet by simply manipulating the locking lever 72 and hand-wheel 71, as above described, to bring the numeral representing the desired sheet length opposite the pointer 70.

A simplified form of apparatus embodying some of the principles of this invention is disclosed in Figs. 11 to 15 of the drawings. In this modification a carriage 99 has supporting and guiding wheels 100 movable along guide rails 101 at the sides of the cutting table as in the form previously described. A tool supporting carriage 102 is movable along guide rods 103, extending transversely above the glass sheet. A lever 104 pivoted at 105 in carriage 102 is adapted to carry the cutting tool 106 which is removably clamped as at 107 in an aperture at the lower end of this lever. Operating handle 108 is connected with the upper end of lever 104, and a spring 109 mounted between lever 104 and a portion of carriage 102 normally swings the lever to such a position that the scoring tool will be elevated away from the glass sheet 1. When the operator pulls on the handle 108 the spring 109 will first be depressed and the cutting tool 106 lowered against the glass sheet 1, and carriage 102 will be drawn along the guides 103 to make the score line across the sheet. It will be understood that this form of scoring device is merely alternative to that disclosed in Figs. 9 and 10, and that either form of scoring device, or any equivalent form could be used with either type of guiding and measuring device as disclosed in this application.

Figure 12:
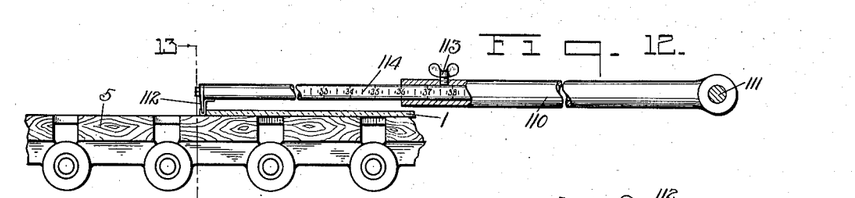
Fig. 12 is a detail view of the measuring rod used in this modification.
Figure 13:
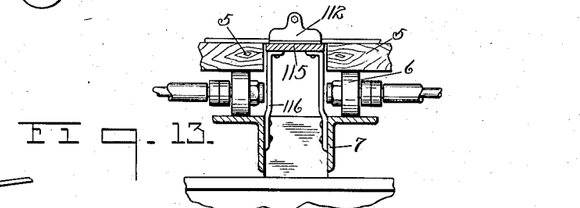
Fig. 13 is a section taken substantially on the line 13—13 of Fig. 12.
Figure 14:
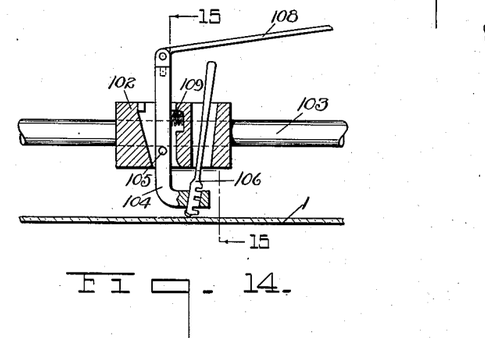
Fig. 14 is a longitudinal section through the scoring tool used in this modification.
Figure 15:
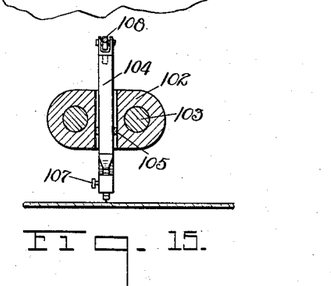
Fig. 15 is a transverse section taken substantially on the line 15—15 of Fig. 14.

A draw bar or measuring-rod 110 is pivoted at one end 111 to carriage 99 and at its other end has a downwardly extending hooked end or projection 112 adapted to engage with the end of glass sheet 1. Bar 110 is made in two telescoping sections clamped in adjustable engagement with one another by set-screw 113. One portion of the bar is calibrated with a scale 114 in inches and fractions thereof, and this scale is so designed that when the numerals indicating the desired length are opposite the end of the other portion of draw bar 110, the distance from hook or projection 112 to the score line will correspond to the distance indicated on the scale 114. The end 112 normally rests upon a stationary guide rail 115 mounted on brackets 116 rising from rails 7, and lying between two of the moving rows of conveyor blocks 5. If a smooth or continuous type of conveyor were used this guide rail 115 would be unnecessary and the hook 112 could be allowed to rest directly upon the upper surface of the moving conveyor.

Figure 11:
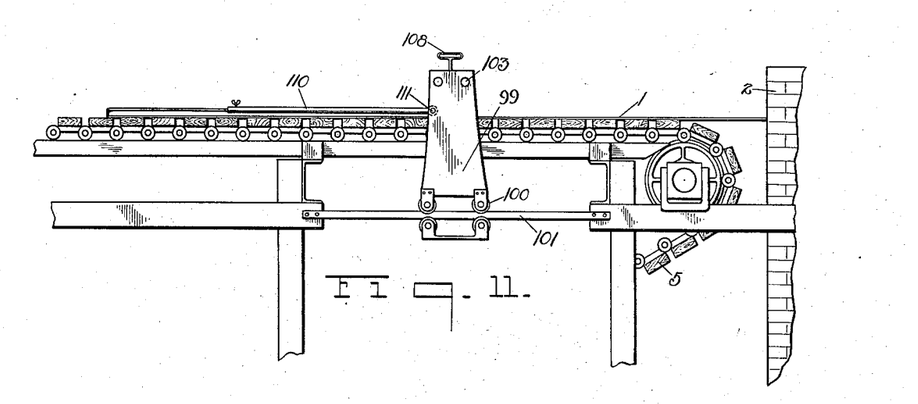
Fig. 11 is a view, similar to Fig. 2, of a simplified form of the apparatus.

With this form of apparatus, when the advancing end of glass sheet engages with hook 112, the draw bar 110 will move the carriage 99 and the scoring device carried thereby along with the sheet 1 and at the speed thereof. After the score has been made, the operator lifts the draw bar 110 from engagement with the end of the glass sheet and returns the carriage 99 to its original position. When the severed section of the glass sheet is removed the hook 112 will fall back onto the guide rail 115 and will be in position to again be engaged by the advancing end of the glass sheet.

Although this latter form of the invention is simpler, the first described form, shown in Figs. 1 to 10 inclusive, is to be preferred since all of the mechanism with the exception of the scoring device is positioned below the table and sheet so as not to obstruct the operator's view of the sheet, nor to interfere in any way with the handling of the severed sheet sections.

· Claims:

1. An apparatus for transversely scoring a moving sheet of glass, comprising a carriage movable parallel with the movement of the sheet and including a guide-bar for a scoring tool extending transversely of the sheet, and means connected to the carriage and engageable with the free end of the advancing sheet for moving the carriage with the sheet.

2. An apparatus for transversely scoring a moving sheet of glass, comprising a carriage movable parallel with the movement of the sheet and including a guide-bar for a scoring tool extending transversely of the sheet, a draw-bar connected with the carriage at one end, and a member at the other end of the bar adapted to engage with the free end of the moving glass sheet.

3. An apparatus for transversely scoring a moving sheet of glass, comprising a carriage movable parallel with the movement of the sheet and including a guide-bar for a scoring tool extending transversely of the sheet, a draw-bar connected with the carriage at one end, and a member at the other end of the bar adapted to be moved to engage with the free end of the moving glass sheet, and means controllable from the carriage for moving the sheet-engaging member into or out of the path of travel of the sheet.

4. An apparatus for transversely scoring a moving sheet of glass, comprising a carriage movable parallel with the movement of the sheet and including a guide-bar for a scoring tool extending transversely of the sheet, a draw-bar connected with the carriage at one end, and a member at the other end of the bar adapted to engage with the free end of the moving glass sheet, and means for adjusting the length of draw-bar between the member and the carriage.

5. An apparatus for transversely scoring a moving sheet of glass, comprising a carriage movable parallel with the movement of the sheet and including a guide-bar for a scoring tool extending transversely of the sheet, a draw-bar connected with the carriage at one end, and a member at the other end of the bar adapted to be moved to engage with the free end of the moving glass sheet, means controllable from the carriage for moving the sheet-engaging member into or out of the path of travel of the sheet, and means for adjusting the length of draw-bar between the member and the carriage.

6. In combination with a conveyor for carrying a moving sheet of glass, stationary guides positioned parallel to the direction of movement of the conveyor and glass sheet, a carriage movable along the guides and including a guide for a scoring tool extending transversely above the glass sheet, and means connected with the carriage for engaging the free end of the glass sheet.

7. In combination with a conveyor for carrying a moving sheet of glass, stationary guides positioned parallel to the direction of movement of the conveyor and glass sheet, a carriage movable along the guides and including a guide for a scoring tool extending transversely above the glass sheet, a movable draw-bar mounted beneath the conveyor and sheet, means at one end of the bar for engaging the end of the glass sheet, and means for connecting another portion of the bar with the carriage, said draw-bar being adjustable to vary the distance between said sheet engaging means and said carriage.

8. In combination with a conveyor for carrying a moving sheet of glass, stationary guides positioned parallel to the direction of movement of the conveyor and glass sheet, a carriage movable along the guides and including a guide for a scoring tool extending transversely above the glass sheet, a movable draw-bar mounted beneath the conveyor and sheet, means at one end of the bar for engaging the end of the glass sheet, means controllable from the carriage for moving the sheet-engaging means into or out of sheet-engaging position, and means for connecting the bar with the carriage, said means being adjustable to vary the distance between said sheet engaging means and said carriage.

9. In combination with a conveyor for carrying a moving sheet of glass, stationary guides positioned parallel to the direction of movement of the conveyor and glass sheet, a carriage movable along the guides and including a guide for a scoring tool extending transversely above the glass sheet, a movable draw-bar mounted beneath the conveyor and sheet, means at one end of the bar for engaging the end of the glass sheet, means controllable from the carriage for moving the sheet-engaging means into or out of sheet-engaging position, and means on the carriage for varying the length of the bar between the carriage and the sheet-engaging means.

10. In combination with a conveyor for carrying a moving sheet of glass, stationary guides positioned parallel to the direction of movement of the conveyor and glass sheet, a carriage movable along the guides and including a guide for the scoring tool extending transversely across the glass sheet, and two independently operable means connected with the carriage for moving the carriage with the sheet, one means being adapted to grip a portion of the conveyor, and the other means being adapted to engage the free end of the moving sheet.

11. In combination with a conveyor for carrying a moving sheet of glass, stationary guides positioned parallel to the direction of movement of the conveyor and glass sheet, a carriage movable along the guides and including a guide for the scoring tool extending transversely across the glass sheet, two independently operable means connected with the carriage for moving the carriage with the sheet, one means being adapted to grip a portion of the conveyor, and the other means being adapted to engage the free end of the moving sheet, and means for changing the length of the latter means between the sheet-engaging portion and the carriage.

12. In combination with a conveyor for carrying a moving sheet of glass, stationary guides positioned parallel to the direction of movement of the conveyor and glass sheet, a carriage movable along and supported by the guides and including a guide for the scoring tool extending transversely across the glass sheet, and means engageable with the free end of the moving sheet and manually controllable from one end of the carriage for causing the carriage to move with the sheet.

13. An apparatus for transversely scoring a moving sheet of glass, comprising a carriage movable parallel with the movement of the sheet and including a cutter guide extending transversely of the sheet, and a measuring device for measuring the length of sheet to be cut extending at substantially right-angles relative to said guide and connected thereto.

14. An apparatus for transversely scoring a moving sheet of glass, comprising a carriage movable parallel with the movement of the sheet and including a cutter guide extending transversely of the sheet, and a graduated measuring device connected to said carriage, said measuring device being arranged beneath the sheet and extending in the direction of travel thereof.

15. An apparatus for transversely scoring a moving sheet of glass, comprising a carriage movable parallel with the movement of the sheet and including a cutter guide extending transversely of the sheet, a measuring device connected to said carriage and movable therewith, and means carried by the measuring device and adapted for abutment with the free end of the sheet being cut.

16. An apparatus for transversely scoring a moving sheet of glass comprising a carriage movable parallel with the movement of the sheet and including a cutter guide extending transversely above the sheet, a cutter carried by said guide and movable vertically towards and away from the sheet independently thereof, and means normally acting to raise the cutter away from the glass and hold it in inoperative position.

17. In sheet glass cutting apparatus, means for supporting a moving sheet of glass, a carriage having means carried thereby and engageable with the end of the sheet whereby said carriage may be made to move with the sheet, and a cutter tool movably carried by said carriage, and means for placing the tool in contact with the sheet and for moving it over said sheet to cut the same when the carriage is moving with the sheet.

Signed at Toledo, in the county of Lucas, and State of Ohio, this 16th day of May, 1924.

CLIFFORD A. ROWLEY.